United States Patent [19]
Garrett

[11] 4,221,500
[45] Sep. 9, 1980

[54] SYNTHETIC SEAWEED

[76] Inventor: William L. Garrett, 100 Dickinson La., West Park, Wilmington, Del. 19807

[21] Appl. No.: 6,567

[22] Filed: Jan. 26, 1979

[51] Int. Cl.$^2$ .............................................. E02B 3/04
[52] U.S. Cl. ...................................... 405/24; 428/17; 428/23
[58] Field of Search .................... 405/24, 21, 15, 25, 405/22, 211; 428/17, 23

[56] References Cited
U.S. PATENT DOCUMENTS

| | | | |
|---|---|---|---|
| 3,299,640 | 1/1967 | Nielsen | 405/24 |
| 3,540,415 | 11/1970 | Bromley | 405/24 |
| 3,559,407 | 2/1971 | Schuur | 405/24 |
| 3,590,585 | 7/1971 | De Winter | 405/24 |
| 3,726,096 | 4/1973 | Bahre | 405/24 |

Primary Examiner—Roy D. Frazier
Assistant Examiner—Alexander Grosz
Attorney, Agent, or Firm—Richard M. Beck

[57] ABSTRACT

Synthetic seaweed for use in inhibiting coastal erosion comprises an elongate anchor with at least one sheet of flexible non-woven material adjacent thereto. A first edge portion of the sheet is secured to the anchor along at least a portion thereof so that the sheet extends outwardly from the anchor terminating at an outer boundary edge. The flexible, non-woven sheet has a series of spaced apart substantially parallel cuts extending from the outer boundary edge to but not through the first edge portion to thereby define a plurality of flexible strips integrally connected by the first edge portion of the sheet. The sheet may be buoyant with or without tabs of closed cell, low density foam affixed to the free end portions of the individual strips to enhance the buoyancy thereof. Also, the sheet may have a specific gravity greater than water with such tabs applied to the strip to provide buoyancy. In use, the anchor rests upon the bottom of the sea and the submerged flexible strips of non-woven material extend upwardly therefrom. The strips sway in the ocean water thereby reducing currents in the surrounding water which permits accretion of suspended sand and promotes sedimentation of solid particles.

10 Claims, 3 Drawing Figures

U.S. Patent    Sep. 9, 1980    4,221,500
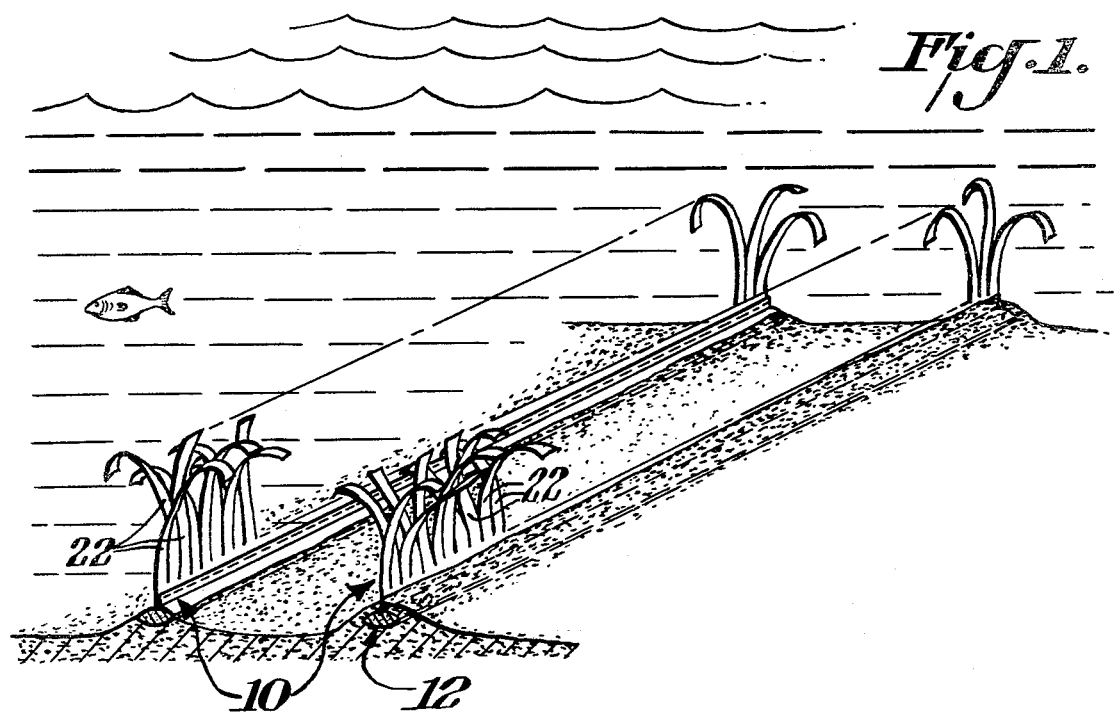
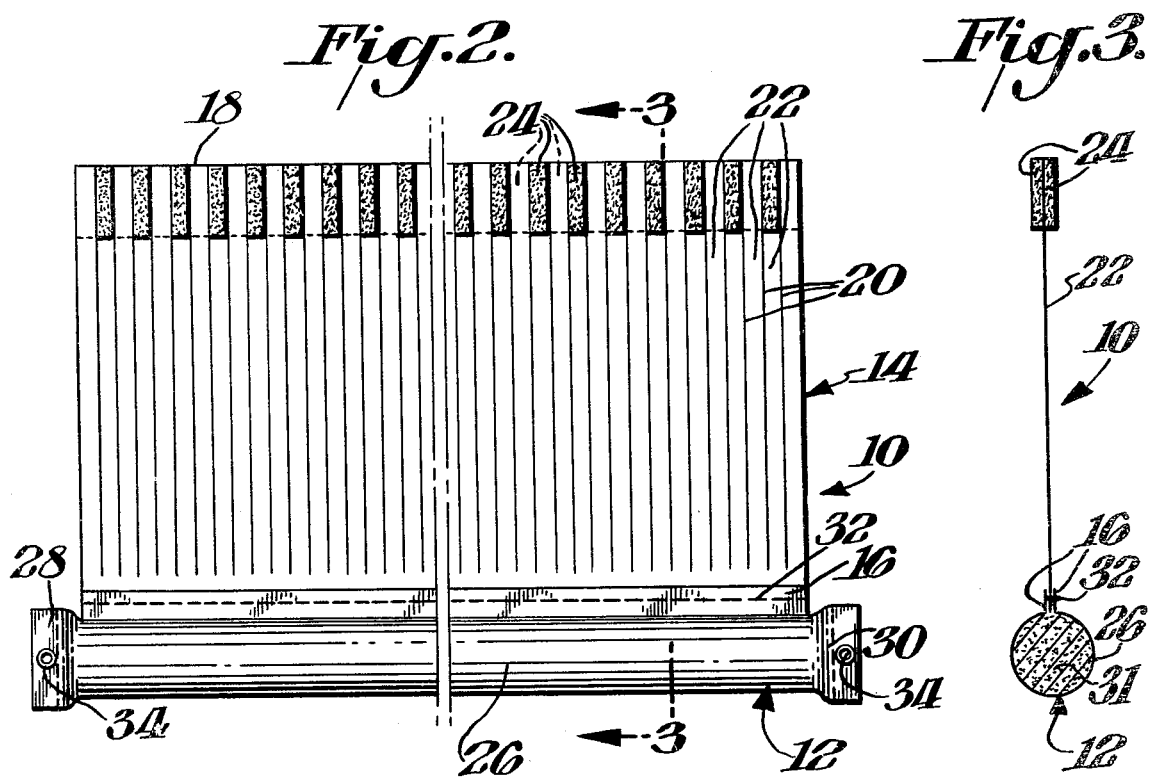

SYNTHETIC SEAWEED

BACKGROUND OF THE INVENTION

The present invention relates to synthetic seaweed, and more particularly to such seaweed for use in building an underwater reef whose purpose is to inhibit coastal erosion.

Prior to the present invention, artificial seaweed constructions have been proposed for combatting coastal erosion. For example, U.S. Pat. No. 3,299,640, granted Jan. 24, 1967, describes a seaweed type structure for influencing the sub-marine migration of material. This structure consists of a screen formed by a large series of filamentary plastic strands secured at one end to an anchoring device placed at the bottom of the sea. The strands are buoyant and therefore assume and retain an upright position thereby reducing currents in the surrounding water while promoting the deposition of sand and other solid materials entrained by the water. Also shown in the above patent is a group of individual spaced apart buoyant tapes secured to a rope-like anchor. In each instance the function of these constructions is to combat coastal erosion.

U.S. Pat. Nos. 3,559,407 and 3,590,585, granted Feb. 2, 1971 and July 6, 1971, respectively, also disclose artificial seaweed wherein assemblages of filamentary strands of foamed, stretched polyolefin are used for influencing the migration of material at the bottom of bodies of water, as in combatting coastal erosion. Entanglement of the filamentary strands is troublesome during manufacture, installation and use, and U.S. Pat. No. 3,590,585 discusses several approaches to prevent such entanglement.

Obviously, it is important that once any artificial seaweed construction is installed, such construction functions to promote sedimentation of solid particles. It is therefore desirable that the seaweed be sufficiently strong to withstand ocean forces and also particularly designed so that the majority of filamentary strands or tapes remain free of entanglement.

SUMMARY OF THE INVENTION

Accordingly, it is an object of the present invention to provide a unique form of synthetic seaweed having high strength which is easy to make and effective in use.

Another object of the present invention is synthetic seaweed fabricated from sheets of non-woven material as opposed to yarn or woven tapes.

Still another object of the present invention is to allow for a wide range of buoyancies of the non-woven material in order to produce a seaweed with optimum resistance to current flow.

In accordance with the present invention, synthetic seaweed for use in inhibiting coastal erosion comprises an elongate anchor with at least one sheet of flexible, non-woven material adjacent thereto. A first edge portion of the sheet is secured to the anchor along at least a portion thereof so that the sheet extends outwardly from the anchor terminating at an outer boundary edge. The sheet has a series of spaced apart substantially parallel cuts extending from the outer boundary edge to but not through the first edge portion to thereby define a plurality of flexible strips integrally interconnected by the first edge portion of the sheet. The anchor serves to hold the synthetic seaweed at the bottom of the sea and the flexible strips assume and retain an upright position in the water. These flexible strips function to effectively reduce ocean currents in the surrounding water which promotes sedimentation and permits accretion of suspended sand. In essence, the synthetic seaweed functions to promote a buildup of the ocean bottom in the same manner as sea vegetation and thus inhibit coastal erosion.

The sheet may be buoyant with or without tabs of closed cell, low density foam affixed to the free end portions of the individual strips to enhance the buoyancy thereof. Also, the sheet may have a specific gravity greater than water with such tabs applied to the strip to provide buoyancy. By increasing or providing such buoyancy to the strips, the upright position thereof in the water is enhanced.

The anchor may comprise a cylindrical tube of flexible material closed at its opposite ends and filled with ballast. The flexible material forming the anchor is non-woven, and the most convenient ballast is sand although other types of ballast may be used.

It is preferred that the width of the strips formed by the parallel cuts in the sheet be substantially the same and within the range of one-quarter inch to six inches wide. The most preferred width of each strip is within the range of two inches to three inches.

It is also preferred that the length of the strips formed by the parallel cuts be substantially the same and within the range of two feet to fifteen feet. The most preferred length of each strip is four feet to eight feet.

The preferred weight of the sheet of non-woven material is within the range of one-half to twelve ounces per square yard, the most preferred weight being three to six ounces per square yard.

BRIEF DESCRIPTION OF THE DRAWINGS

Novel features and advantages of the present invention in addition to those noted above will become apparent to those persons skilled in the art from a reading of the following detailed description in conjunction with the accompanying drawings wherein:

FIG. 1 is a diagrammatic view illustrating synthetic seaweed in use, according to the present invention;

FIG. 2 is a side elevational view of the synthetic seaweed shown in FIG. 1 with the middle portion thereof broken away; and FIG. 3 is a sectional view taken along line 3—3 of FIG. 2.

DETAILED DESCRIPTION OF THE INVENTION

Referring in more particularity to the drawings, FIG. 1 shows synthetic seaweed 10 for use in inhibiting coastal erosion. It is well known that sea vegetation promotes the sedimentation of suspended sand and other solid particles to thereby cause a buildup of these particles in the vicinity of the vegetation. This is accomplished by the vegetation which acts as a barrier to thereby reduce currents in the surrounding water which permits the sedimentation of the water borne particles. The present synthetic seaweed functions in the same manner and may be installed where there is an absence of sea vegetation to reduce water currents and thereby promote sedimentation of solid particles. This results in a buildup of the ocean bottom in the form of an underwater reef whose purpose is to inhibit coastal erosion.

The synthetic seaweed 10 comprises an elongate anchor 12 with a sheet of flexible, non-woven material 14 adjacent the anchor. A first edge protion 16 of the sheet 14 is secured to the anchor 12 so that the sheet 14 extends outwardly from the anchor terminating at an outer boundary edge 18. The sheet 14 has a series of spaced apart substantially parallel cuts 20 extending from the outer boundary edge 18 to but not through the first edge portion 16 to thereby define a plurality of flexible strips 22 integrally interconnected by the first edge portion 16 of the sheet 14.

The flexible material comprising the sheet 14 is a synthetic non-woven material having significant advantages in the overall construction of the synthetic seaweed 10 of the present invention. A non-woven material is important since it is inexpensive and the edge portions do not unravel. Additionally, by utilizing a non-woven sheet in the manufacture of the present synthetic seaweed, the techniques employed to produce the finished product are quite simple. Also, by fabricating the synthetic seaweed 10 from the sheet 14 the width of the strips 22 may be greater than the width of the heretofore used foamed yarn. By increasing the width, the resistance to current flow is increased which results in more sedimentation of solid particles.

For example, the non-woven sheet 14 may be TYVEK, TYPAR or REEMAY, all manufactured and sold by E. I. du Pont de Nemours & Company. TYPAR is a continuous filament polypropylene having high strength per unit weight, and is therefore preferred. TYVEK is a high density polyethylene, and REEMAY is a polyester. TYVEK and TYPAR each have a specific gravity less than water which makes them buoyant. On the other hand REEMAY has a specific gravity slightly greater than water.

Other non-woven materials that may be used include MIRIFI, manufactured by Celanese Corporation; BIDIM, manufactured by Monsanto Company; and SUPAC, manufactured by Phillips Petroleum Company. Any other wet, dry laid, or needled non-woven material which can be cut into strips which do not unravel and have sufficient strength to withstand ocean current forces may be used.

Preferably the weight of the sheet 14 of non-woven material is within the range of one-half to twelve ounces per square yard, preferably three to six ounces per square yard. Also, it is preferred that the tensile strength of the non-woven sheet 14 be such that a one inch strip thereof has a breaking strength of 10 to 70 pounds.

The width of the strips 22 formed by the parallel cuts 20 are substantially the same and preferably in the range of one-quarter inch to six inches in width, with a most preferred range of two inches to three inches wide. With the strips directly adjacent one another and no space therebetween, an effective barrier is presented which reduces the current in the surrounding area.

Additionally, the free end portion of each strip 22 or a portion of the strips may be provided with a tab 24 of a highly buoyant material, such as closed cell, foamed polyethylene or other similar material. These tabs may be secured by adhesive or stitching or any convenient method and serve to enhance the overall buoyancy of the strands when the flexible sheet 14 is made of buoyant material. The strands then have more of a tendency to extend upright in the water where the current is high. Also, when the flexible sheet 14 is made of non-woven material having a specific gravity greater than water, the tabs 24 provide the necessary buoyancy to the strands The amount of foamed material may be varied as little as one inch along the strips 22 to an amount covering each strip up to the full length thereof. Closed cell, non-water absorbent foam is available in a broad range of densities, thicknesses and widths, and when these materials are affixed to each strip or at least some of them, the buoyancy may be varied as desired to meet the resistance requirements of a specific current force. The foam may be applied to one or both sides of the strip as needed.

The length of the strips 22 formed by the parallel cuts 20 are substantially the same and preferably within the range of two feet to fifteen feet, the most preferred range being four to eight feet.

The anchor 12 comprises a cylindrical tube 26 of flexible material closed at its opposite ends 28,30 and filled with ballast 31, such as sand. The tube 26 may be filled with any convenient and inexpensive ballast material. The diameter of the tube which can be easily varied will depend on a number of factors including ultimate location of the synthetic seaweed 10 and the width and length of the strips 22. When sand is used as ballast, the tube diameter may be between twelve inches and twenty-four inches, for example. The flexible material forming the anchor may also be non-woven and in most cases the anchor is fabricated from the same material as the sheet 14. Although stitches 32 are shown as the means for securing the sheet 14 to the anchor 12, other types of securement may be utilized within the scope of the invention and in some cases it may be convenient to form both the anchor and the sheet from a single piece of material with appropriate stitching to form the tube 26. Additionally, the present invention also includes synthetic seaweed where a plurality of sheets 14 are arranged end to end and connected to a single anchor 12. Conversely, a plurality of anchors 12 arranged end to end may be secured to a single sheet.

In use, one end 28 of the anchor 12 may be closed during the manufacturing operation with the other end 30 closed at the site of installation after the tube 26 is filled with sand, for example. The synthetic seaweed 10 is then installed as shown in FIG. 1 and the strips 22 thereof sway in the water currents and act as a barrier to promote sedimentation of suspended sand and other solid particles entrained by the water. Ultimately this causes a buildup of the sea bottom and such buildup functions to inhibit beach erosion. Grommets 30 are provided at the ends of the anchor 12 for interconnecting a series of seaweed units 10.

I claim:

1. Synthetic seaweed for use in inhibiting coastal erosion comprising an elongate anchor, a plurality of flexible strips secured to the elongate anchor extending outwardly therefrom and terminating at free end portions, and buoyant tabs of foam material secured to the exterior of at least the free end portions of at least some of the strips.

2. Synthetic seaweed as in claim 1 wherein the buoyant tabs comprise closed cell foam material.

3. Synthetic seaweed as in claim 2 wherein the buoyant tabs are secured to only one side of at least some of the strips.

4. Synthetic seaweed as in claim 2 wherein the buoyant tabs are secured to both sides of at least some of the strips.

5. Synthetic seaweed as in claim 1 wherein the flexible strips comprise non-woven material and the elongate anchor is in the form of a cylindrical tube of flexible, non-woven material closed at its opposite ends and filled with ballast.

6. Synthetic seaweed for use in inhibiting coastal erosion comprising an elongate anchor in the form of a cylindrical tube of flexible, non-woven material closed at its opposite ends and filled with ballast, at least one sheet of similar flexible, non-woven material adjacent the elongate anchor, means securing a first edge portion of the sheet to the anchor along at least a portion thereof so that the sheet extends outwardly therefrom terminating at an outer boundary edge, the sheet having a series of spaced apart substantially parallel cuts extending from the outer boundary edge to but not through the first edge portion to thereby define a plurality of flexible strips integrally interconnected by the first edge portion of the sheet and buoyant tabs of foam material secured to the exterior of at least some of the strips.

7. Synthetic seaweed as in claim 6 wherein the buoyant tabs of foam material are secured to at least the free end portions of the strips.

8. Synthetic seaweed as in claim 6 wherein the width of the strips formed by the parallel cuts are substantially the same and within the range of one-quarter inch to six inches.

9. Synthetic seaweed as in claim 6 wherein the length of the strips formed by the parallel cuts are substantially the same and within the range of two feet to fifteen feet.

10. Synthetic seaweed as in claim 6 wherein the weight of the non-woven material is within the range of one-half to twelve ounces per square yard.

* * * * *